US012297081B2

(12) United States Patent
Wong et al.

(10) Patent No.: US 12,297,081 B2
(45) Date of Patent: May 13, 2025

(54) METHOD AND SYSTEM FOR CONFIGURING AN ELEVATOR MANAGEMENT DEVICE

(71) Applicant: OTIS ELEVATOR COMPANY, Farmington, CT (US)

(72) Inventors: Sam Thieu Wong, Bridgeport, CT (US); Donald Mccall Eager, Milford, CT (US)

(73) Assignee: OTIS ELEVATOR COMPANY

( * ) Notice: Subject to any disclaimer, the term of this patent is extended or adjusted under 35 U.S.C. 154(b) by 1388 days.

(21) Appl. No.: 16/883,336

(22) Filed: May 26, 2020

(65) Prior Publication Data

US 2021/0371238 A1 Dec. 2, 2021

(51) Int. Cl.
*B66B 5/00* (2006.01)
*B66B 1/34* (2006.01)

(52) U.S. Cl.
CPC .......... *B66B 5/0037* (2013.01); *B66B 1/3446* (2013.01)

(58) Field of Classification Search
CPC .... B66B 1/00; B66B 1/02; B66B 1/06; B66B 1/34–3423; B66B 1/3446; B66B 1/3453; B66B 5/00; B66B 5/0006; B66B 5/0018; B66B 5/0037; B66B 5/0087
See application file for complete search history.

(56) References Cited

U.S. PATENT DOCUMENTS 5,787,020 A * 7/1998 Molliere ............... B66B 5/0006 702/183
6,471,014 B1 * 10/2002 Daniel .................. B66B 5/0006 187/290
8,006,822 B2 * 8/2011 Tschuemperlin ......... B66B 1/34 187/247

* cited by examiner

*Primary Examiner* — Christopher Uhlir
(74) *Attorney, Agent, or Firm* — Carlson, Gaskey & Olds, P.C.

(57) ABSTRACT

An illustrative example embodiment of a method of configuring an elevator management device includes issuing a predetermined series of commands to perform a corresponding series of elevator system functions; for each of the series of elevator system functions, automatically determining a respective portion of an elevator controller that is active during a corresponding one of the activated series of elevator system functions; automatically generating information including a relationship between the respective portions of the elevator controller and the corresponding ones of the activated series of elevator system functions; and configuring the elevator management device to communicate with the elevator controller based on the information.

14 Claims, 2 Drawing Sheets

METHOD AND SYSTEM FOR CONFIGURING AN ELEVATOR MANAGEMENT DEVICE

BACKGROUND

Elevator systems typically include a controller at the site of the elevator system. Communicating with the controller can provide useful information for monitoring the condition or performance of the elevator system. Such information can be used by building managers, technicians or remotely located monitoring service personnel. It is also possible to communicate with some elevator controllers to instigate selected elevator system functions from a remote location.

If an elevator system does not include original equipment to communicate with the elevator controller or if a different elevator management device is being installed, it has proven difficult to establish the desired interface with the elevator controller. One approach includes manually establishing connections with discrete communication ports of the elevator controller and manually determining how to set up an interface with the elevator controller based on information gathered through those connections. This process is time-consuming, tedious and prone to human error.

SUMMARY

An illustrative example embodiment of a method of configuring an elevator management device includes issuing a predetermined series of commands to perform a corresponding series of elevator system functions; for each of the series of elevator system functions, automatically determining a respective portion of an elevator controller that is active during a corresponding one of the activated series of elevator system functions; automatically generating information including a relationship between the respective portions of the elevator controller and the corresponding ones of the activated series of elevator system functions; and configuring the elevator management device to communicate with the elevator controller based on the information.

In an example embodiment having at least one feature of the method of the previous paragraph, configuring the elevator management device to communicate with the elevator controller includes programming the elevator management device to subsequently issue commands to the respective portion of the elevator controller to perform any selected corresponding one of the elevator system functions.

In an example embodiment having at least one feature of the method of any of the previous paragraphs, configuring the elevator management device to communicate with the elevator controller includes programming the elevator management device to observe the respective portions of the elevator controller during a subsequent performance of any corresponding one of the elevator system functions and to generate an output regarding the observed portion.

In an example embodiment having at least one feature of the method of any of the previous paragraphs, each respective portion of the elevator controller comprises a communication port and determining the respective portion of the elevator controller that is active during the corresponding one of the activated series of elevator system functions includes automatically identifying an address of each communication port.

In an example embodiment having at least one feature of the method of any of the previous paragraphs, configuring the elevator management device to communicate with the elevator controller includes configuring the elevator management device to observe the respective communication ports and to generate an output indicating performance of any one of the respective communication ports during subsequent performance of the corresponding one of the elevator functions.

In an example embodiment having at least one feature of the method of any of the previous paragraphs, determining the respective portion of the elevator controller that is active during the corresponding one of the activated series of elevator system functions includes connecting an input/output address conversion module to input/output ports of the elevator controller.

In an example embodiment having at least one feature of the method of any of the previous paragraphs, the input/output address conversion module generates the information including the relationship between the respective portions of the elevator controller and the corresponding ones of the activated series of elevator system functions.

An example embodiment having at least one feature of the method of any of the previous paragraphs includes providing the commands to the elevator controller and using the elevator controller to perform the series of elevator functions.

An illustrative example embodiment of a system for configuring an elevator management device includes at least one processor and associated memory, the at least one processor being configured to determine a respective portion of an elevator controller that is active during a corresponding one of a predetermined series of activated elevator system functions, automatically generate information including a relationship between the respective portions of the elevator controller and the corresponding ones of the series of activated elevator system functions, and configure the elevator management device to communicate with the elevator controller based on the generated information.

In an example embodiment having at least one feature of the system of the previous paragraph, the at least one processor configures the elevator management device by programming the elevator management device to observe the respective portions of the elevator controller during a subsequent performance of any corresponding one of the elevator system functions and to generate an output regarding the observed portion.

In an example embodiment having at least one feature of the system of any of the previous paragraphs, each respective portion of the elevator controller comprises a communication port and the at least one processor is configured to automatically identifying an address of each communication port.

In an example embodiment having at least one feature of the system of any of the previous paragraphs, the at least one processor configures the elevator management device to observe the respective communication ports and to generate an output indicating performance of any one of the respective communication ports during subsequent performance of the corresponding one of the elevator functions.

In an example embodiment having at least one feature of the system of any of the previous paragraphs, the at least one processor includes an input/output address conversion module configured to be connected to input/output ports of the elevator controller.

In an example embodiment having at least one feature of the system of any of the previous paragraphs, the input/output address conversion module generates the information.

The various features and advantages of at least one disclosed example embodiment will become apparent to those skilled in the art from the following detailed description. The drawings that accompany the detailed description can be briefly described as follows.

DETAILED DESCRIPTION

Embodiments of this invention facilitate automatically configuring an elevator management device to communicate with an elevator controller.

Figure 1:
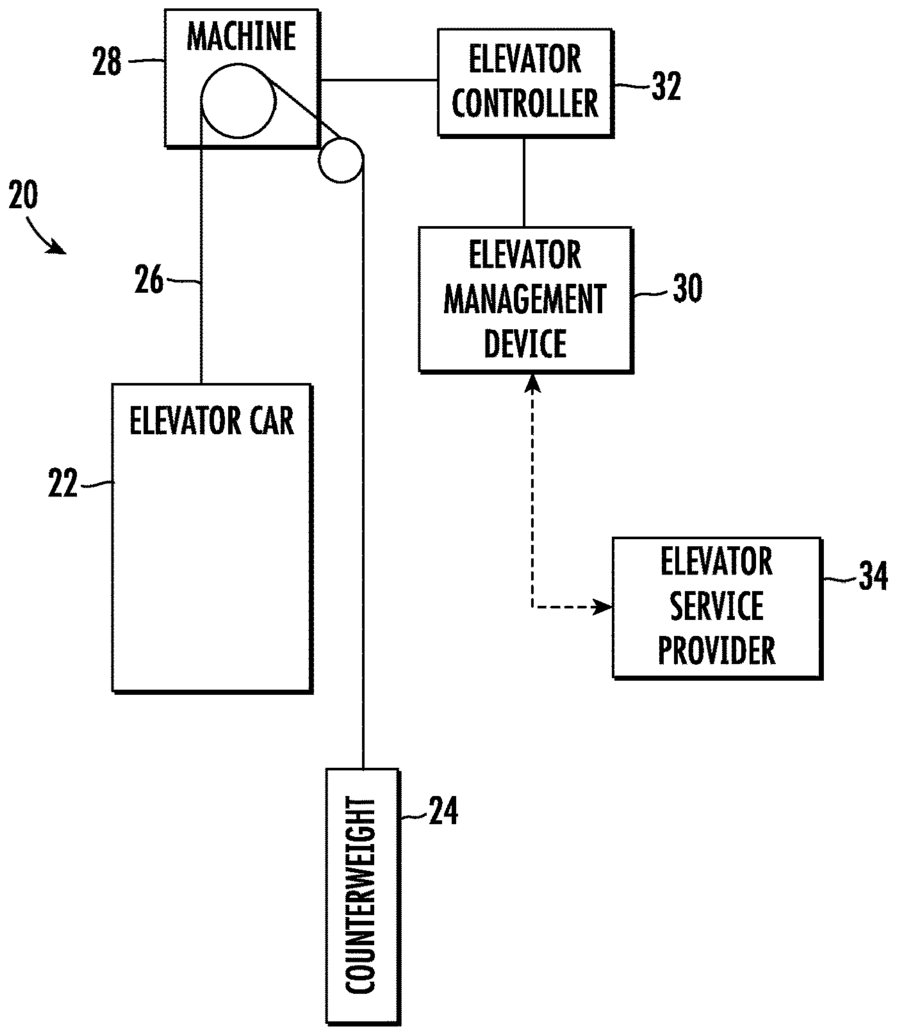
FIG. 1 schematically illustrates selected portions of an example embodiment of an elevator system.

FIG. 1 schematically illustrates selected portions of an elevator system 20. An elevator car 22 and a counterweight 24 are coupled and suspended by roping 26. A machine 28 selectively causes movement of the roping 26 to control the movement and position of the elevator car 22.

An elevator management device 30 communicates with an elevator controller 32 that controls operation of at least the machine 28 and other components of the elevator system 20. The elevator management device 30 is configured to monitor operation of the elevator system 20 by receiving information or data from the elevator controller 32 regarding the system operation. The elevator management device 30 also communicates with an elevator service provider 34, which may be located remote from the site of the elevator system 20. The elevator management device 30 provides data to the elevator service provider 34 that may be useful for determining when maintenance or repair is needed and diagnosing a problem with the elevator system 20 from a remote location.

Figure 2:
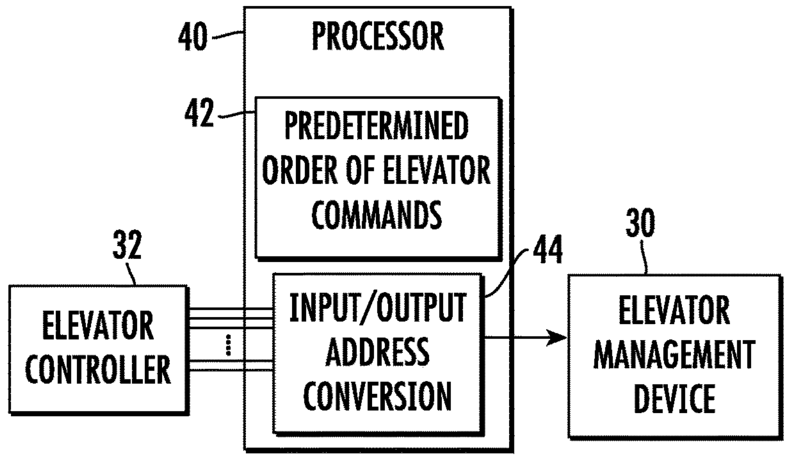
FIG. 2 schematically illustrates an example embodiment of a system for configuring an elevator management device.

The manner in which the elevator management device 30 is configured to communicate with the elevator controller 32 includes an automated process. FIG. 2 schematically illustrates a system that performs an automated elevator management device configuration process. At least one processor 40 includes memory 42 containing at least a predetermined series of elevator system functions or operations. In some embodiments, a mechanic or technician causes the elevator system 20 to perform the series of functions. For example, an individual places calls for elevator service to selected floors using hall call buttons or a destination entry device of the elevator system 20. Other functions can be instigated, such as causing car doors to open or close or placing the elevator system into a maintenance mode. Those skilled in the art that have the benefit of this description will be able to select an appropriate series of elevator functions to meet their particular needs.

The processor 40 also includes an input/output address conversion module 44 that is configured to convert information regarding addresses of communication ports of the elevator controller 32 into information or data that is useful for configuring the elevator management device 30 to communicate with the elevator controller 32.

Figure 3:
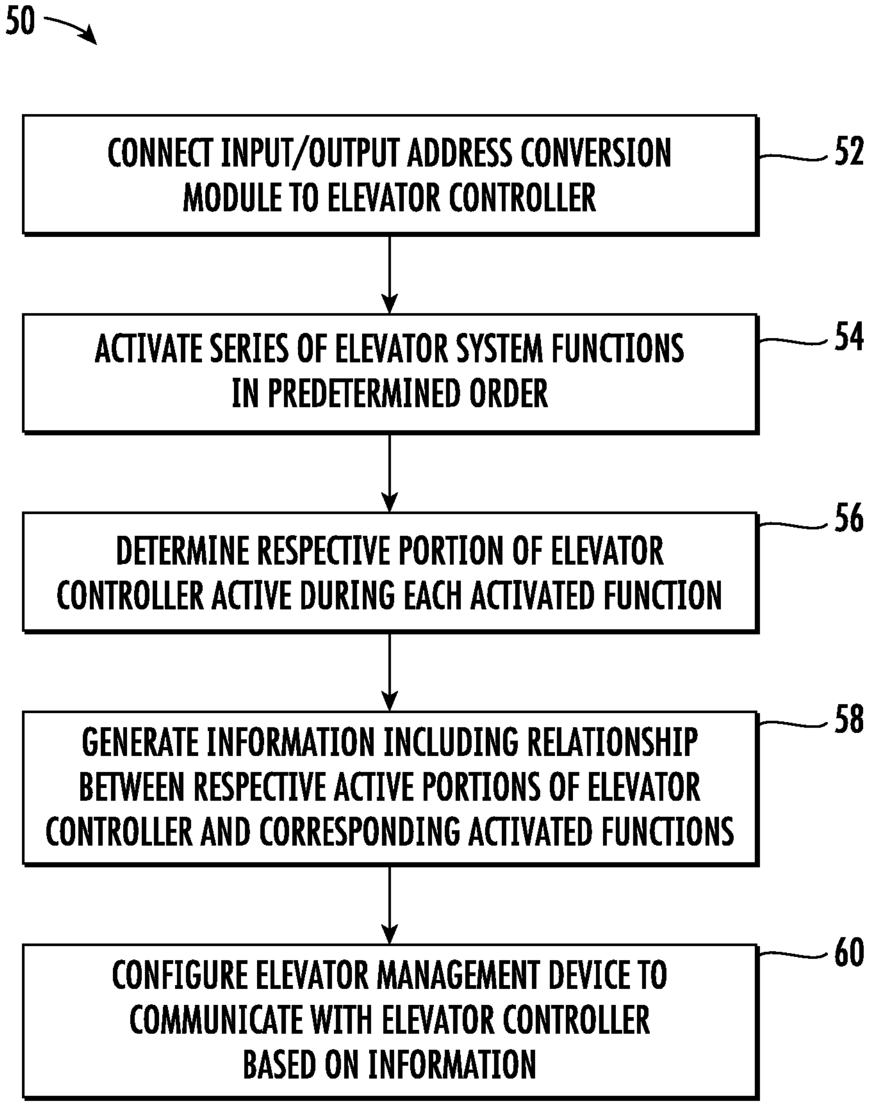
FIG. 3 is a flow chart diagram summarizing an example method of configuring an elevator management device.

FIG. 3 is a flow chart diagram 50 that summarizes an example approach. At 52, the address conversion module 44 is connected with appropriate portions of the elevator controller 32. For example, the processor 40 has a set of connections that are configured to be coupled with input/output communication ports of the elevator controller 32.

At 54, a series of elevator system functions are performed in a predetermined order. Instigating the functions performed at 54 may be manually using the elevator system components associated with the functions, such as hall call buttons to call the elevator car 22 to a particular landing. Other embodiments include using a service tool to provide commands directly to the elevator controller 32 or using a script that is recognizable by the elevator controller 32.

At 56, the processor 40 determines which portions of the elevator controller 32 are active during each of the functions performed at 54. In particular, the address conversion module 44 of the processor 40 determines which communication port of the elevator controller 32 is active or involved during performance of each of the functions. The communication ports are input/output ports of the elevator controller 32 in the illustrated example embodiment and each of the input/output ports has a unique address.

The order in which the communication ports of the elevator controller 32 are associated with the processor 40 is not important. The address conversion module 44 recognizes the order in which communication ports of the elevator controller 32 are active and the order of the corresponding elevator functions is known based on the information in the memory 42. This approach reduces time and labor associated with gathering information or data regarding the elevator controller 32 needed to establish useful communications between the elevator controller 32 and the elevator management device 30.

At 58, the processor 40 generates information or data including a relationship between the respective portions of the elevator controller 32 and the corresponding ones of the activated series of elevator system functions. The address conversion module generates the information or data in the illustrated example embodiment. The determined information includes, for example, a listing of the active communication port and its associated address with the corresponding one of the activated elevator functions. The information generated at 58 is useful to the elevator management device 30 for establishing and conducting communications with the elevator controller 32.

At 60, the elevator management device 30 is configured to communicate with the elevator controller 32 based on the information or data from the processor 40. In some embodiments, the processor 40 automatically programs the elevator management device based on the information generated at 58. In some embodiments, the processor 40 provides firmware to the elevator management device 30 that configures the elevator management device 30 for communication with the elevator controller 32.

Once configured for communication with the elevator controller 32, the elevator management device 30 is configured to report information to the elevator service provider 34 regarding the elevator system 20.

The illustrated system uses the illustrated method to automate the process of configuring the elevator management device 30. The example approach improves the configuration process by automating the identification of portions of the elevator controller 32 active during specific elevator functions and providing useful information to the elevator management device 30. Using a predetermined order of functions and automatically tracking the order in which communication ports become active facilitates automatically linking or associating elevator controller communication port addresses with particular elevator system functionality. The disclosed example system and method also eliminate the possibility of human error, which otherwise was possible when observing the elevator controller 32 and converting the observations into information for configuring the elevator management device 30.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of configuring an elevator management device, the method comprising the steps of:

(A) issuing a predetermined series of commands to perform a corresponding series of elevator system functions;

(B) for each of the series of elevator system functions, automatically determining a respective portion of an elevator controller that is active during a corresponding one of the series of elevator system functions;

(C) automatically generating information including a relationship between the respective portions of the elevator controller and the corresponding ones of the series of elevator system functions; and (D) configuring the elevator management device to communicate with the elevator controller based on the information.

2. The method of claim 1, wherein step (D) comprises programming the elevator management device to subsequently issue commands to the respective portion of the elevator controller to perform a selected corresponding one of the elevator system functions.

3. The method of claim 1, wherein step (D) comprises programming the elevator management device to observe the respective portion of the elevator controller during a subsequent performance of a corresponding one of the elevator system functions and to generate an output regarding an observed portion.

4. The method of claim 1, wherein:

each respective portion of the elevator controller comprises a communication port; and step (B) comprises automatically identifying an address of each communication port.

5. The method of claim 4, wherein step (D) comprises configuring the elevator management device to observe the respective communication ports and to generate an output indicating performance of any one of the respective communication ports during subsequent performance of the corresponding one of the elevator functions.

6. The method of claim 1, wherein step (B) comprises connecting an input/output address conversion module to input/output ports of the elevator controller.

7. The method of claim 6, wherein the input/output address conversion module generates the information of step (C).

8. The method of claim 1, comprising:

providing the commands to the elevator controller; and using the elevator controller to perform the series of elevator functions.

9. A system for configuring an elevator management device, the system comprising:

at least one processor and associated memory, the at least one processor being configured to determine a respective portion of an elevator controller that is active during a corresponding one of a predetermined series of activated elevator system functions, automatically generate information including a relationship between the respective portions of the elevator controller and the corresponding ones of the series of activated elevator system functions, and configure the elevator management device to communicate with the elevator controller based on the generated information.

10. The system of claim 9, wherein the at least one processor configures the elevator management device by programming the elevator management device to observe the respective portion of the elevator controller during a subsequent performance of a corresponding one of the elevator system functions and to generate an output regarding an observed portion.

11. The system of claim 9, wherein:

each respective portion of the elevator controller comprises a communication port; and the at least one processor is configured to automatically identifying an address of each communication port.

12. The system of claim 11, wherein the at least one processor configures the elevator management device to observe the respective communication ports and to generate an output indicating performance of any one of the respective communication ports during subsequent performance of the corresponding one of the elevator functions.

13. The system of claim 9, wherein the at least one processor includes an input/output address conversion module configured to be connected to input/output ports of the elevator controller.

14. The system of claim 13, wherein the input/output address conversion module generates the information.

* * * * *